United States Patent
Schober et al.

(10) Patent No.: US 8,703,039 B2
(45) Date of Patent: Apr. 22, 2014

(54) MICROSTRUCTURED COMPOSITE COMPONENT AND METHOD AND DEVICE FOR PRODUCING THE SAME

(75) Inventors: Andreas Schober, Fuerth (DE); Alexander Gross, Babenhausen (DE); Joerg Hampl, Erfurt (DE)

(73) Assignee: Technische Universitat Ilmenau (DE)

( * ) Notice: Subject to any disclaimer, the term of this patent is extended or adjusted under 35 U.S.C. 154(b) by 0 days.

(21) Appl. No.: 13/497,814

(22) PCT Filed: Feb. 24, 2010

(86) PCT No.: PCT/EP2010/052346
§ 371 (c)(1),
(2), (4) Date: May 30, 2012

(87) PCT Pub. No.: WO2011/035936
PCT Pub. Date: Mar. 31, 2011

(65) Prior Publication Data
US 2012/0231226 A1  Sep. 13, 2012

(30) Foreign Application Priority Data
Sep. 27, 2009  (DE) .......................... 10 2009 044 112

(51) Int. Cl.
*B29C 51/14* (2006.01)
(52) U.S. Cl.
USPC ............................ 264/510; 264/522; 264/545
(58) Field of Classification Search
None
See application file for complete search history.

(56) References Cited

U.S. PATENT DOCUMENTS 3,281,301 A * 10/1966 Bolesky .......................... 156/221
3,982,877 A *  9/1976 Wyeth et al. ................... 425/503

FOREIGN PATENT DOCUMENTS

| DE | 29711763 U1 | 11/1998 |
| EP | 0545055 A1 | 6/1993 |
| EP | 0652099 A2 | 5/1995 |
| EP | 0745471 A1 | 12/1996 |
| JP | 61-228929 A | 10/1986 |

OTHER PUBLICATIONS

PCT/EP2010/052346. English translation of the Written Opinion. Aug. 31, 2010. 10 pages.

* cited by examiner

*Primary Examiner* — Monica Huson
(74) *Attorney, Agent, or Firm* — Mark D. Wieczorek; Mayer & Williams, PC

(57) ABSTRACT

A microstructured composite component is provided including structures for carrying out fluid processes. A device is provided for producing microstructured composite components. A method provided includes a first step during which a first film is arranged above a second film between first and second mold parts. The first and/or second mold parts have microstructured cavities to be filled. In a second step, the first and second mold parts are heated in at least one region in which they contact one of the films. An excess pressure is then produced between the first film and the second film to force the first and/or second films into the cavities. In a further step, the first and second mold parts are pressed together by a pressing force. Once the first mold part, the second mold part, the first film and the second film are cooled, they form a microstrutured composite component.

7 Claims, 6 Drawing Sheets

Figure 1:
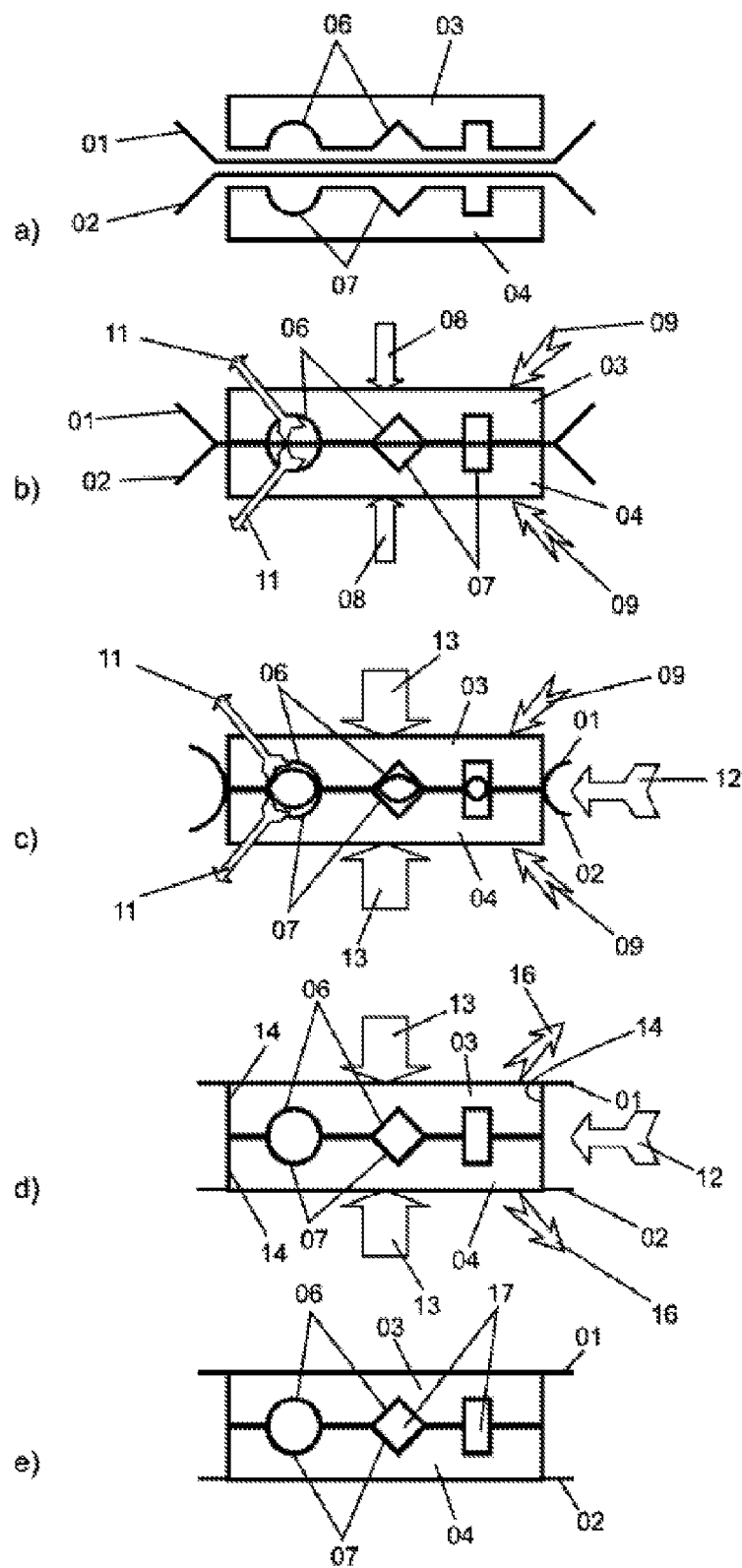

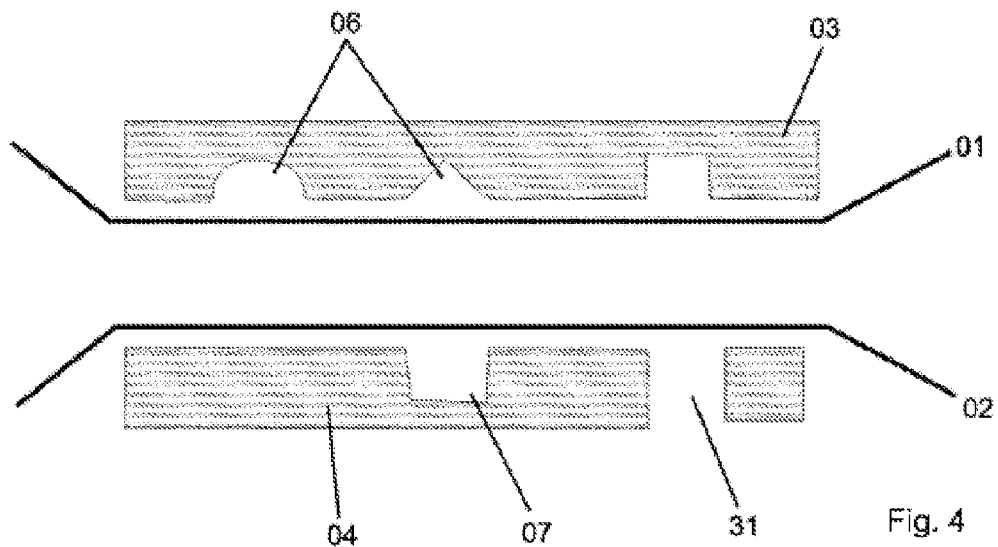
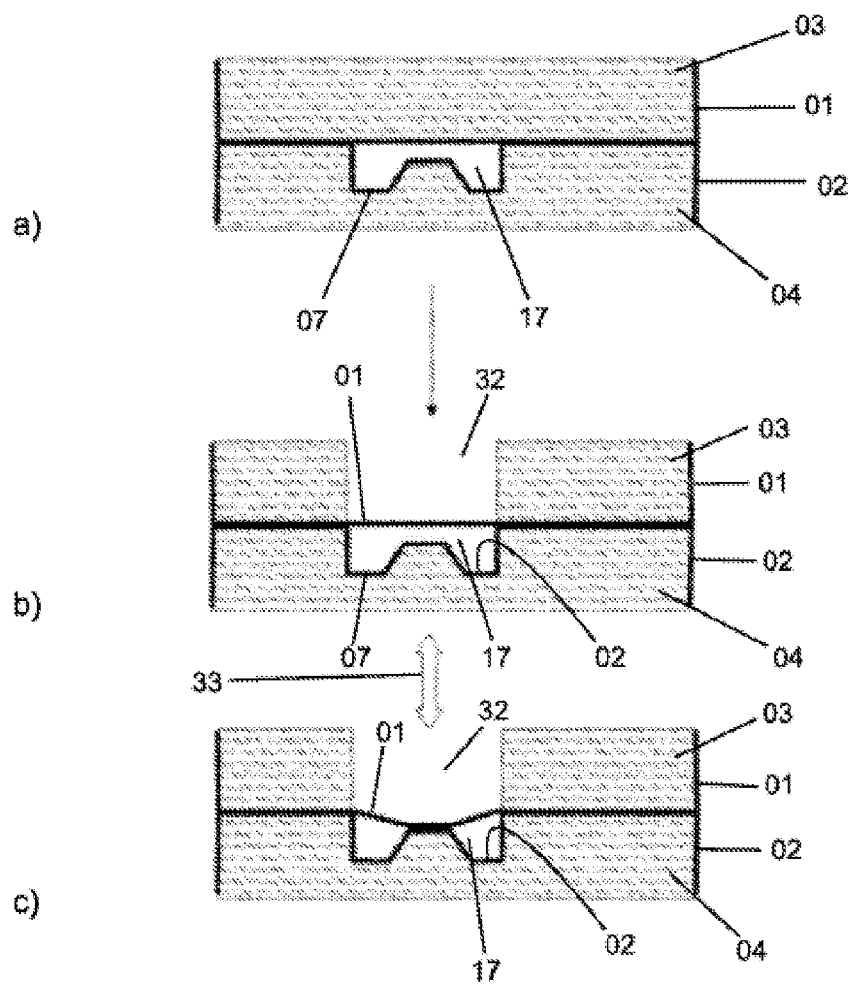
Fig. 4
Fig. 5

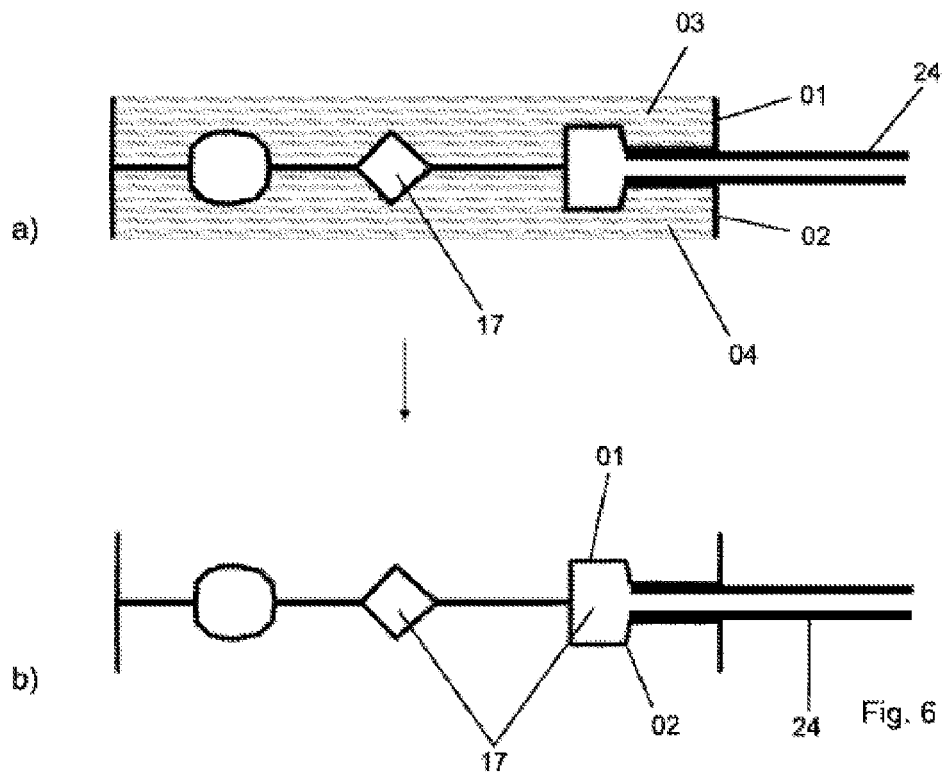
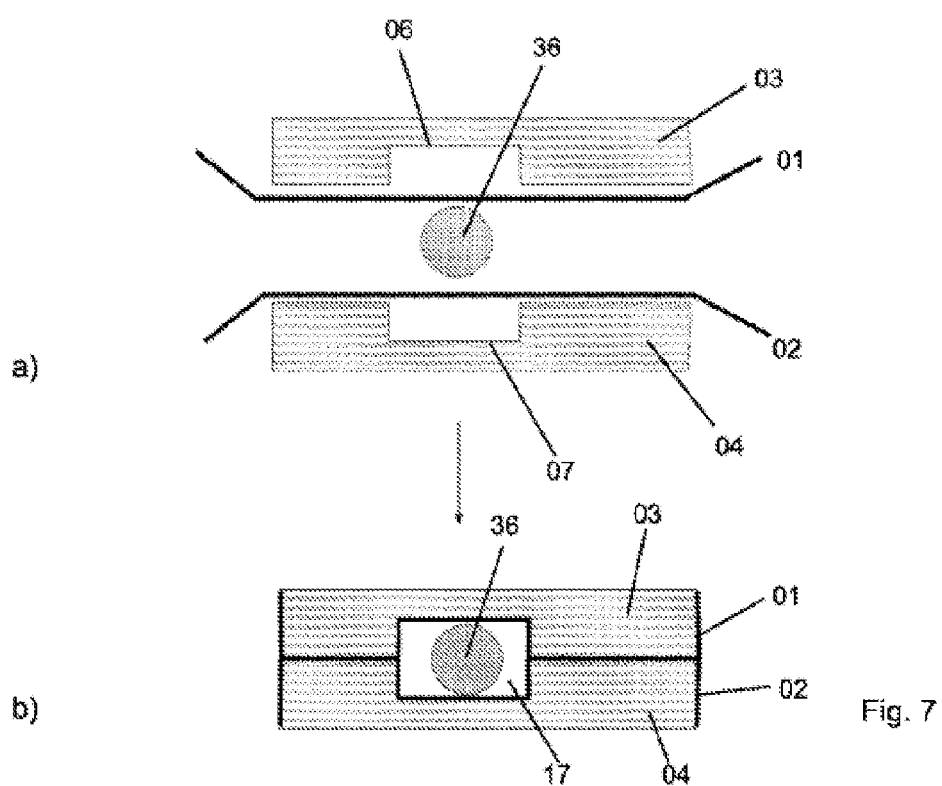

MICROSTRUCTURED COMPOSITE COMPONENT AND METHOD AND DEVICE FOR PRODUCING THE SAME

The present invention relates to a method for producing a microstructured composite component which, for example, comprises microfluidic structures for carrying out fluid processes in chemical, biological or medical applications. The invention further relates to a device for producing microstructured composite components and to a microstructured component.

From DE 197 01 568 C1 a method is known for producing a structured layer consisting of a mold material and an auxiliary substrate. The mold material consists of a thermoplastic material and, prior to processing, is heated to above the glass transition temperature. The auxiliary substrate consists of a mechanically stable and temperature-resistant steel plate. Following an embossing step, the auxiliary substrate is detached and replaced by a curved and/or structured substrate.

DE 199 24 005 A1 discloses a method for producing microstructured objects from a thermoplastic material. First, a composite layer is produced consisting of two different layers, each of a thermoplastic material. The first layer constitutes an embossing layer, while the second layer is comprised of a material that can be detached from the embossing layer. Using a plunger-like forming tool which has microstructured projections disposed on a planar base plate, the embossing layer is embossed in such a way that the projections puncture through the embossing layer and press into the second layer. Next, the embossed composite layer is extracted from the forming tool and the embossing layer removed from the second layer.

DE 101 34 040 A1 discloses a method for producing microfluidic hollow plastic structures. In a heat shaping machine or a hot embossing press a thermoplastic synthetic film is heat molded in a single process cycle using a gaseous or fluid pressure medium to form fluid microstructures. At the same time the synthetic film is bonded to a rigid or rigidly flexible substrate that cannot be thermoformed due to the effects of temperature or pressure.

The object of the present invention is, starting from the current state of the art, to provide an improved microstructured component which is suitable, in particular, for microfluidic applications and which, even if designed with complex structures or additional functional elements, can be produced at a low cost. A corresponding method and a device for producing the improved microstructured components are also to be specified.

The aforementioned object is achieved by a method for producing a microstructured composite component in accordance with attached claim 1. The object is further achieved by a device for producing microstructured composite components in accordance with appended subordinate claim 9. Further, the invention provides a microstructured composite component in accordance with appended subordinate claim 16.

The method according to the present invention is used to produce a microstructured composite component, for example, a composite component comprising microfluidic functional structures for application in fluidic processes. The method comprises a first step in which a first film is arranged above a second film between a first mold part and a second mold part. This arrangement can be achieved, for example, by laying the second film on the second mold part and the first film on the second film, after which the first mold part is arranged above the first film. Alternatively, the arrangement can be achieved by inserting the two films between the two mold parts. The first mold part and/or the second mold part has microstructured cavities to be filled. These cavities serve to shape the foil that comes into contact with each mold part. The mold parts may be, for example, rigid, temperature-resistant rectangular shaped bodies made of glass or silicon or also of plastic, metal or any other non-organic or organic material, each of which has a substantially plane outer surface that faces the respective opposing mold part. Both mold parts may also consist of different materials where, as the case may be, occurring differences in thermal expansion may be compensated by the two interlying films. The substantially planar outer surface includes microstructured cavities to be filled and constitutes the surface of the mold part that comes into contact with the respective film. In a second step of the method according to the present invention, the first mold part and the second mold part are heated in at least one region in which they contact one of the films. The first mold part and the second mold part are heated in order to thereby heat the first film and the second film, with the result that all of the contact surfaces between the first mold part, the second mold part, the first film and the second film are heated. In a further step of the method according to the present invention, provision is made for producing an excess pressure between the first film and the second film in order to force the first film and/or the second film into the cavities of the first mold part and/or of the second mold part. The excess pressure is marked by the fact that it is greater than a pressure surrounding the first mold part and the second mold part. The excess pressure can be produced, for example, by forcing a gas into the hollow space between the two films with the aid of a booster pump. As an alternative, or supplementary thereto, the excess pressure can also be produced by creating a vacuum with the aid of a vacuum pump in the space surrounding the two films and the two mold parts. It is then preferable to suitably seal off the space between the first film and the second film at the edges of the first film and the second film in order to build up a high degree of excess pressure. This can be accomplished, for example, by fusing or pressing together the edge regions of the first film and the second film. In a further step of the method according to the present invention, the first mold part and the second mold part along with the interlying first film and the interlying second film are pressed together by a pressing force. This results in a bonding of the contacting regions of the heated surfaces between the first film and the first mold part, between the second film and the second mold part and between the first film and the second film. Such bonding can be in the form of an adhesion or fusion. For example, the films may be provided with an adhesive layer. Once they are cooled, the first mold part, the second mold part, the first film and the second film form a microstructured composite component. The first mold part and the second mold part are bonded to one another by way of the first film and the second film. Between the first film and the second film, which now constitute a unit, are formed, for example, microchannels for conveying liquids.

An advantage of the method according to the present invention is that it can be used for producing a variety of microstructures. The method allows for the production of very small structures, for example, of channels having a diameter of 100 μm or less. Structures having a diameter of up to 5 mm or more can also be achieved. With the method according to the present invention it is possible to increase the size of the surfaces available for the microstructures on the mold parts as compared to the prior art, for example, 10 cm×20 cm. The excess pressure ensures that complex microstructures form on the entire available surface through thermal molding of the first film and/or the second film.

Using the method according to the present invention, it is possible, for example, to laminate microstructured cavities in molded parts made of glass. Producing microstructures in glass using an etching process gives rise to markedly hydrophilic surfaces that are less suitable for microfluidic processes. With the method according to the present invention microstructures are produced, while at the same time the surface characteristics of the latter are set by the selection of suitable films. Both films determine the surface characteristics of the microstructure.

It is preferable to use a thermoplastic as material for the first film and for the second film. Suitable are, for example, fluoroplastics made of FEP, PTFE or ETFE. Films of this type make it possible to produce channel surfaces with very low surface tension and which in addition can be optically transparent.

The first film and the second film are heated preferably at least to a glass transition temperature of the thermoplastic. In this way, it is possible to thermoplastically deform the first film and the second film such that they fully retain their intended shape even after cooling. Both mold parts must have a temperature resistance which comprises at least the glass transition temperature of the thermoplastic. This is the only condition resulting from the method according to the present invention that is required of the material of both mold parts.

In a particular embodiment of the method according to the present invention, the first film and the second film are pre-structured prior to being placed between the first mold part and the second mold part. For example, the first film and/or the second film can be irradiated with heavy ions and subsequently etched to produce pores in the films.

It is especially advantageous if, in the process of placing the first film over the second film, functional elements and/or a third film are arranged between the first film and the second film. Such functional elements can be, for example, fluid connections in the form of tubes or electrode wires. The functional elements can be arranged in such a way that they are securely bonded to the first film and/or the second film during compression of the first mold part, the first film, the second film and the second mold part. The functional elements can also be arranged in such a way that after compression, they remain capable of movement within a microstructure of the first film and/or of the second film. For example, passive valves may be realized in this way. Movable magnetic parts can be manipulated from outside the composite component.

The surface of the first mold part and/or second mold part that contacts the first film and the second film may also be provided with metallic structures in order to make possible, electrowetting, for example. In electrowetting, the wetting capability of the surface within a microstructure is modified by application of an electric current in order to influence the fluidic processes.

The third film can, for example, be configured as a perforated film, a net, a lattice, or a weave in order, for example, to allow the permeation of gas. In the microstructure of the composite component being produced, the third film may constitute a filter, an electrochemical diaphragm or a matrix for cells. A metal lattice can be inserted between the first film and the second film for chemical, catalytic applications, for example, or for electrochemical applications. Additional films may also be placed between the first mold part and the first film and/or between the second mold part and the second film, for example in the form of adhesive films.

In a particular embodiment of the method according to the present invention, the first mold part and/or the second mold part, once they have cooled, can be provided with one or more recesses in order to expose the first film and/or the second film in the region of the one or more recesses. The exposed region in the composite component can be utilized, for example, in order to mechanically act on the film. Thus, the exposed region of the film can be deformed periodically in order to execute a pumping or ventilating function within the microstructure.

In a particular embodiment of the method according to the present invention, the first mold part and/or the second mold part are completely removed after cooling. When both mold parts are removed, for example, by an etching process, the mold part to be produced is then comprised of the two films forming a unit and, optionally, the functional elements disposed therebetween.

For the method according to the present invention, the first mold part and the second mold part are preferably designed so that the two microstructured cavities to be filled are mirror images of one another. The first mold part and the second mold part are pressed together in such a way that the cavity of the first mold form is a mirror opposite of the hollow cavity of the second mold form. Mold parts formed in this way result in rounded and symmetrical microstructures, for example, channels having a circular cross-section.

The device according to the present invention is used to produce microstructured composite components and comprises first of all a first yoke for accommodating a first mold part and a second yoke for accommodating a second mold part disposed opposite the first mold part. As a result, the first yoke and the second yoke are distanced from one another to enable the first mold part and the second mold part to be arranged therebetween. The device according to the present invention further includes a force application device for applying a force, with which the first yoke is pushed in the direction of the second yoke. By this means, it is possible to press together the mold parts to be arranged between the first yoke and the second yoke. The force application device must at least allow for the necessary pressing force to be applied to the first yoke and/or to the second yoke. The force application device can, for example, be in the form of a press with which the first yoke and the second yoke are pressed together. However, the force application device can also be formed by a mechanical connector, for example, by means of which the pressing force can be applied by an external machine or manually to the first yoke and/or the second yoke. The device according to the present invention also includes a booster pump for generating an excess pressure in a hollow space between two films disposed between the first mold part and the second mold part. The device according to the present invention further includes a heating device for heating at least a transitional area between the first mold part and the second mold part. With the aid of the heating device, it is possible to heat the first mold part and the second mold part, as well as the films to be placed between the first mold part and the second mold part, in such a way that the films are shaped by the mold part and a bond is formed between the first mold part and the second mold part. The excess pressure in the hollow space between the two films ensures that the heated films assume a microstructured shape by pressing them into the microstructured cavities to be filled within the mold parts.

The device according to the present invention is used in particular to implement the method according to the present invention and makes it possible to produce complex microstructured composite components at a low cost. The device according to the present invention can, however, also be used for modified versions of the method.

In a preferred embodiment of the device according to the present invention, the device also includes a housing in which at least the first yoke and the second yoke are disposed. Consequently, the mold parts and films to be placed between the first yoke and the second yoke will also be disposed in the housing. The housing is connected to a negative pressure pump for generating a vacuum within the housing. With the aid of the negative pressure pump, it is possible to increase the excess pressure generated by the booster pump in the hollow space between the films. The negative pressure pump can be in the form of a vacuum pump, for example, with which the excess pressure that can be generated is increased by the atmospheric pressure. This can ensure that the films are pressed to a heightened degree into the microstructured cavities of the mold parts.

The device according to the present invention preferably also includes a film holder for circumferentially holding the two films The film holder can, for example, be a clamping device which clamps the edge of each of the films. The film holder can also serve to seal off the hollow space between the two films.

The film holder preferably comprises a spacer ring that fully encloses the first mold part and the second mold part, a pressure ring and a base ring. The spacer ring is attachable to the base ring for clamping one of the two films therebetween. The pressure ring is attachable to the spacer ring for clamping the other of the two films therebetween. Thus, the spacer ring bounds the hollow space between the two films. It has an opening for connecting the booster pump.

The pressure ring of the film holder may preferably be acted upon by the force application device via a spring with a force in the direction of the spacer ring seated on the base ring. As a result, the force applied via the force application device is, for one, used to press the first mold part and the second mold part together, and for another, to press the spacer ring, the pressure ring and the base ring of the film holder together, thereby ensuring that the spacer ring is sealed off from the two films.

The device according to the present invention preferably further comprises a sealing arrangement for completely sealing the two films in order to build up a high excess pressure in the space between the two films. The sealing arrangement can be an integral component of the film holder, for example, by designing the sealing arrangement in the form of sealing rings on the end face of the spacer ring. The sealing rings seal the films off from the spacer ring.

The microstructured composite component according to the present invention comprises a first mold part and a second mold part disposed above the first mold part. Disposed between the first mold part and the second mold part are a first film and a second film, which together form a bonding element between the first mold part and the second mold part. The first mold part is bonded securely with the second mold part via the first film and via the second film. The first film and/or the second film include microstructures which are shaped in microstructured cavities in the first mold part and/or in the second mold part. As a result of this, the first film and/or the second film form a lamination of the first mold part and/or of the second mold part, in particular of the microstructured cavities. The microstructures form hollow spaces between the first film and the second film, through which, for example, fluids can flow.

The microstructured composite component according to the present invention is, in particular, the end result of the method according to the present invention. It can be produced with complex microstructures and additional functional elements within the microstructures at low cost. There are, however, other ways of producing the microstructured composite component according to the present invention.

The first film and the second film of the microstructured composite component according to the present invention are comprised preferably of a thermoplastic, for example, a fluoroplastic which has minimal surface tension.

In a preferred embodiment of the microstructured composite component according to the present invention, a third film and/or functional elements are disposed between the first film and the second film. The third film can be a perforated film, for example, a net, a lattice or a weave. The third film can also be a colored, black or reflective film in order to utilize the microstructured composite component for spectroscopic or optical purposes. The functional elements can be used, for example, to implement a pump or a valve within the microstructure. However, the functional elements can also be tubes or electrodes.

In a particular embodiment of the microstructured composite component according to the present invention, the first mold part and/or the second mold part include one or more recesses, through which the first film and/or the second film are exposed in the region of the one or more recesses. The recesses allow the exposed regions of the respective film to be acted upon, in order, for example, to implement a pumping function.

In another embodiment of the microstructured composite component according to the present invention, the first film and/or the second film are not placed exclusively between the first mold part and the second mold part, but rather also cover the outer surfaces of the first mold part and/or the second mold part, whereby the latter are laminated. This lamination protects the first mold part and/or the second mold part, and thus the entire microstructured composite components from external influences.

Figure 2:
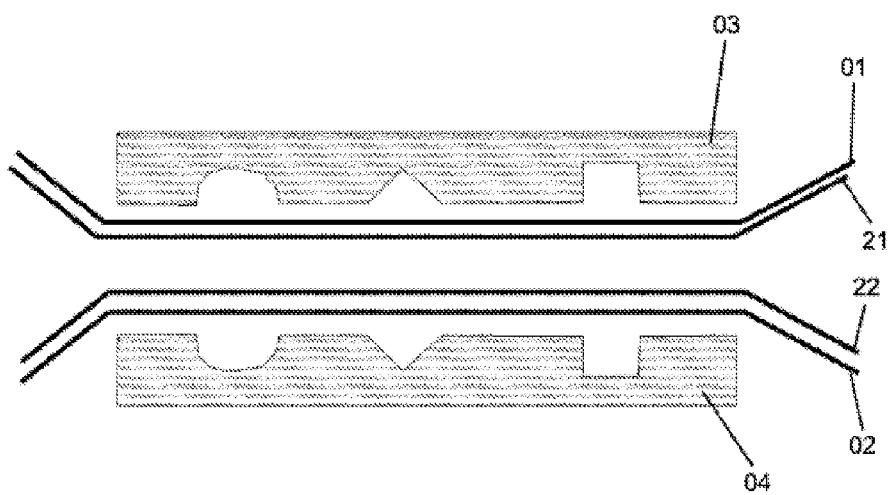
Figure 3:
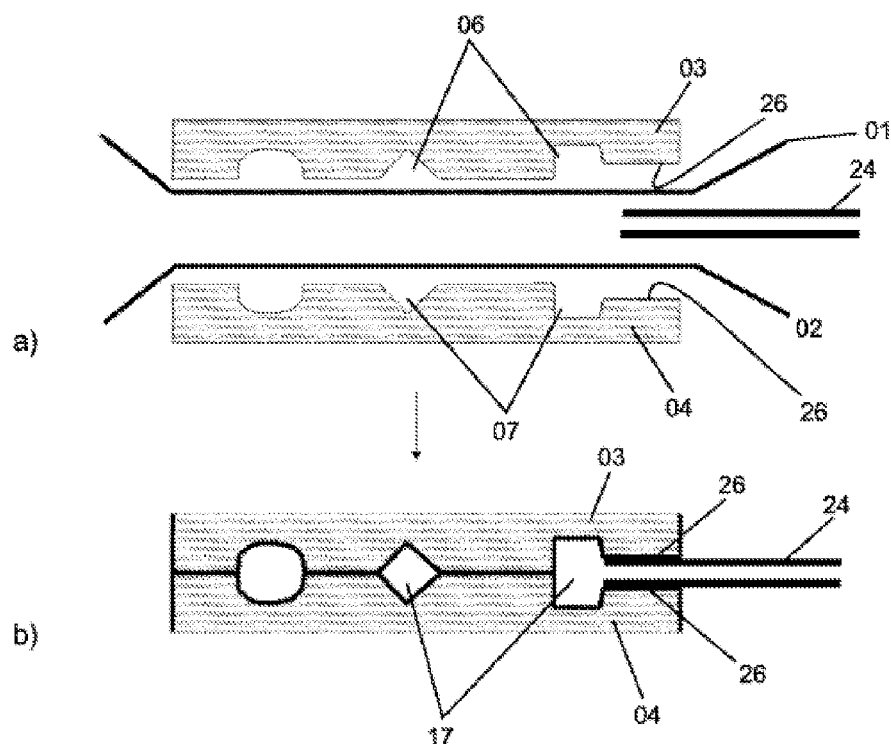
Figure 8:
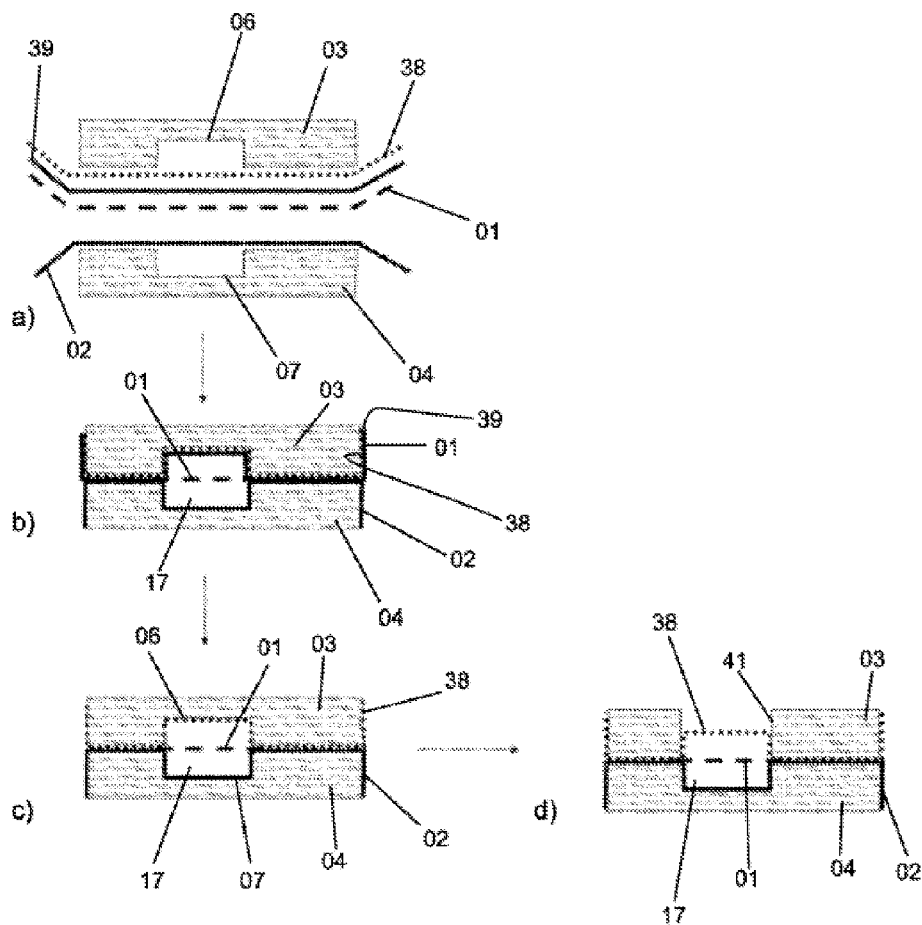
Figure 9:
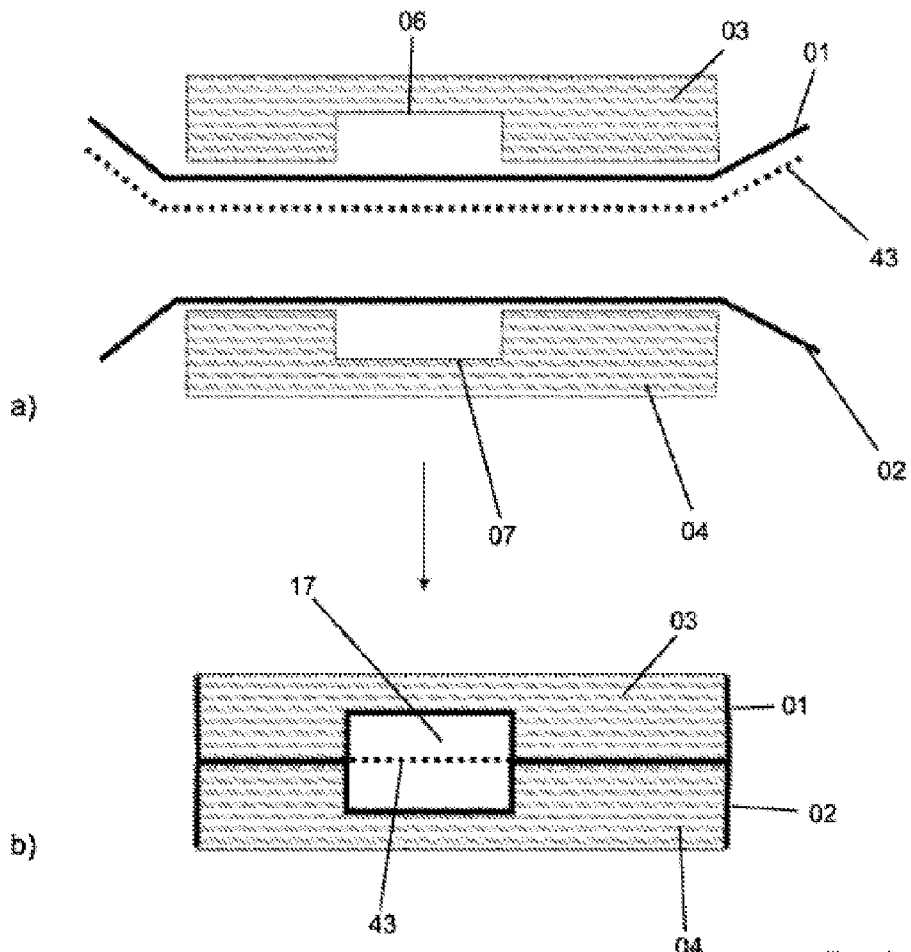
Figure 10:
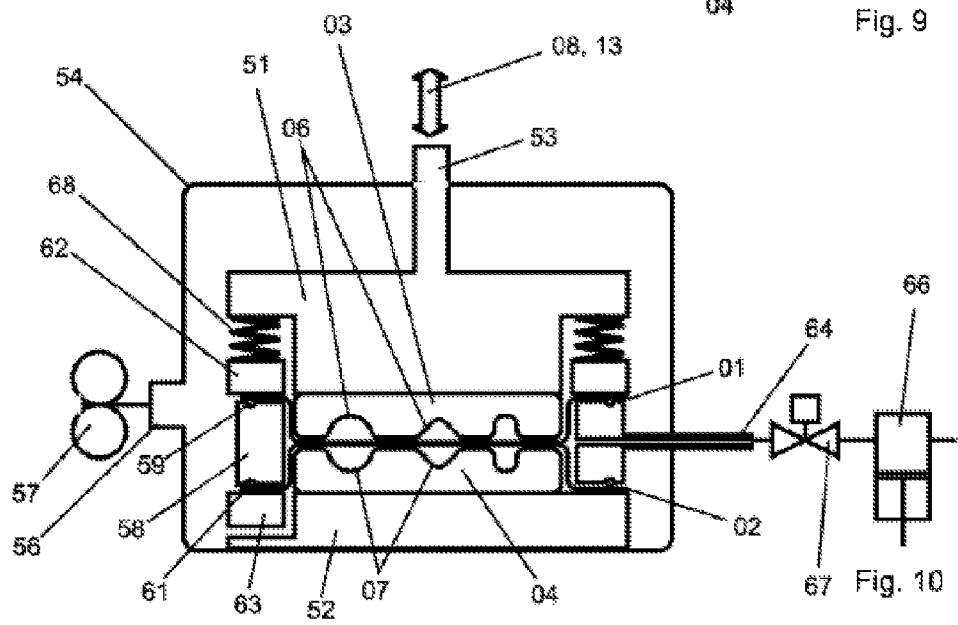

Further advantages, details and refinements of the present invention are set out in the following description of several embodiments, with reference to the drawing. In the drawings:

FIG. 1: shows five steps of a preferred embodiment of the method for producing a microstructured composite component according to the present invention;

FIG. 2: shows a step of a particular embodiment of the method according to the present invention;

FIG. 3: shows two steps of a further embodiment of the method according to the present invention in which a tube is inserted;

FIG. 4: shows a step of an embodiment of the method according to the present invention in which a mold part with a recess is used;

FIG. 5: shows three steps of a further embodiment of the method according to the present invention in which a recess is created in a mold part;

FIG. 6: shows two steps of a further particular embodiment of the method according to the present invention in which the mold parts are completely removed;

FIG. 7: shows two steps of an embodiment of the method according to the present invention in which a functional element is inserted;

FIG. 8: shows four steps of a further particular embodiment of the method according to the present invention;

FIG. 9: shows two steps of an embodiment of the method according to the present invention in which a perforated film is inserted; and FIG. 10: shows a preferred embodiment of the device for producing microstructured composite components according to the present invention.

FIG. 1 shows five steps of a preferred embodiment of the method for producing a microstructured composite component. The illustrations a) to e) of FIG. 1 each show one of the five steps. Illustration a) shows a first step in which a first polymer film 01 and a second polymer film 02 are arranged between a first mold part 03 and a second mold part 04. The first film 01 and the second film 02 are identical in design and are completely overlappingly arranged. The first mold part 03 includes a first microstructured cavity 06. The second mold part 04 includes a second microstructured cavity 07. The first microstructured cavity 06 and the second microstructured cavity 07 can be introduced into the first mold part 03 and the second mold part 04 by any desired method, for example, by etching, irradiating, milling or embossing. Accordingly, any desired geometries and also undercuts can be produced. The first microstructured cavity 06 and the second microstructured cavity 07 are designed in mirror symmetry. The first microstructured cavity 06 and the second microstructured cavity 07 are used to shape the first polymer film 01 and the second polymer film 02.

Illustrate b) of FIG. 1 shows a second step of the method according to the present invention. In this second step the first mold part 03 and the second mold part 04 are pressed together by a contact force 08, by means of which the first polymer film 01 and the second polymer film 02 come into contact and are sandwiched between the first mold part 03 and the second mold part 04. The contact force 08 is held constant by means of a control. Further, heat is transferred to the first mold part 03 and second mold part 04 through which the first mold part 03 and the second mold part 04 are heated. In addition, a vacuum 11, representing a technical vacuum, is created in a space in which the first mold part 03 and the second mold part 04 are disposed. This results in the evacuation of the region between the first polymer film 01 and the region between the second polymer film 02 and the second mold part 04.

Illustration c) of FIG. 1 shows a third step of the method according to the present invention. The heat 09 transferred to the first mold part 03 and to the second mold part results in the first polymer film 01 and the second polymer film 02 being heated as well. The first polymer film 01 and the second polymer film 02 have reached a temperature that is slightly above the glass transition temperature of the polymer of the first polymer film 01 and of the second polymer film 02. As a result, this enables the first polymer film 01 and the second polymer film 02 to be thermoplastically deformed. An excess pressure impacts the space between the first polymer film 01 and the second polymer film 02 for the simple reason that this space is sealed off from the space that surrounds the first mold part 03 and the second mold part 04 and which is impacted by the vacuum 11. The excess pressure in the space between the first polymer film 01 and the second polymer film 02 is further increased by pumping a forming gas 12 at a high excess pressure into this space. The high excess pressure in the space between the first polymer film 01 and the second polymer film 02, in addition to the thermoplastic deformation of the first polymer film 01 and the second polymer film 02, results in the first polymer film 01 and the second polymer film 02 conforming to the shape of the first microstructured cavity 06 and of the second microstructured cavity 07. The first polymer film 01 and the second polymer film 02 form the first microstructured cavity 06 and the second microstructured cavity 07. In this third step of the method according to the present invention, it is necessary to increase the force for pressing together the first mold part 03 and the second mold part 04 in order to counteract the excess pressure between the first film 01 and the second film 02. Further on, the force for pressing together the first mold part 03 and the second mold part 04 is increased to a pressing force 13. In this way, the first polymer film 01 and the second polymer film 02 are pressed between the first mold part 03 and the second mold part 04 in such a way that, as a result of their thermoplastically deformed state, they bond together the first mold part 03 and the second mold part 04.

Illustration d) of FIG. 1 shows a fourth step of the method according to the present invention. The fourth step commences once the first polymer film 01 and the second polymer film 02 have completely filled the first microstructured cavity 06 and the second microstructured cavity 07. The excess pressure between the first polymer film 01 and the second polymer film 02 further results in the first polymer film 01 and the second polymer film 02 being pressed on lateral outer surfaces 14 of the first mold part 03 and of the second mold part 04. The first polymer film 01 and the second polymer film 02 form a lamination of the first mold part 03 and the second mold part 04 in the region of the first microstructured cavity 06 and of the second microstructured cavity 07 as well as outer surfaces 14. While the pressing force 13 is being maintained, the first mold form 03 and the second mold form 04 are no longer heated during the fourth step of the method according to the present invention, but rather are cooled by the ambient temperature, such that heat 16 is given off by the first mold part 03 and by the second mold part 04. Initially, this results in the first polymer film 01 and the second polymer film 02 dropping below the glass transition temperature, at which point thermoplastic deformation of the first polymer film 01 and the second polymer film 02 is no longer possible. Consequently, the first polymer film 01 and the second polymer film 02 form a durable lamination and create a bond between the first mold part 03 and the second mold part 04.

Illustration e) of FIG. 1 shows a fifth step of the method according to the present invention, in which the resultant composite component is achieved. The first mold part 03 and the second mold part 04 as well as the first polymer film 01 and the second polymer film 02 have cooled completely, and form a single, permanently bonded composite component, in which microstructured hollow spaces 17 are formed between the first microstructured cavity 06 coated with the first polymer film 01 and the second microstructured cavity 02 coated with the second polymer film 02.

FIG. 2 shows a first step of a particular embodiment of the method according to the present invention. In this embodiment of the method according to the present invention, a third film 21 and a fourth film 22 are arranged between the first polymer film 01 and the second polymer film 02. The third film 21 and the fourth film 22 have particular features for accomplishing specific functions. For example, the third film 21 and the fourth film 22 can be colored, black or reflective in order to design the microstructured composite component being produced for spectroscopic or optical applications. The first polymer film 01, the second polymer film 02, the third film 21 and/or the fourth film 22 can also be designed to function as bonding agents. Furthermore, the first mold part 03 and/or the second mold part 04 can be pre-laminated before undergoing the method according to the present invention. Said pre-lamination can itself form the first polymer film 01 or the second polymer film 02.

FIG. 3 shows two steps of a particular embodiment of the method according to the present invention. Illustration a) of FIG. 3 shows a first step of this embodiment in which a tube 24 can also be arranged between the first polymer film 01 and the second polymer film 02. The tube 24 is arranged, in particular, in an edge region of the first mold part 03 and of the second mold part 04, wherein a portion of the tube 24 is disposed outside of the space between the first mold part 03 and the second mold part 04. The first mold part 03 and the second mold part 04 each include a tube sleeve 26 into which the tube 24 can be precisely fitted.

Illustration b) of FIG. 3 shows a step of this embodiment of the method according to the present invention, in which the microstructured composite component is already formed. The tube 24 is securely fitted between the tube sleeves 26 of the first mold part 03 and of the second mold part 04. The tube 24 leads from the outside of the composite component into one of the microstructured cavities 17 of the composite component, through which fluids, for example, can be directed into the microstructured hollow spaces 17 of the composite component. As in the case of the tube 24, it is also possible to introduce other functional elements, such as wires or actuators, into the microstructured composite component.

FIG. 4 shows a step of another embodiment of the method according to the present invention. In this embodiment, the second mold part 04 is provided with a recess 31. As a result of the recess 31, a region of the second polymer film 02 in the composite component being produced is not covered by the second mold part 04, but rather is freely accessible. The recess 31 can be created at different steps of the method according to the present invention. FIG. 4 also shows by way of example that the first microstructured cavity 06 and the second microstructured cavity 07 do not have to be designed in mirror symmetry. Further, the first mold part 03 or the second mold part 04 can be designed completely without a microstructured cavity.

FIG. 5 shows three steps of an embodiment of the method according to the present invention, in which, as in the embodiment shown in FIG. 4, the mold parts 03, 04 are not completely closed. Illustration a) of FIG. 5 shows a step in which the microstructured composite component is achieved to the extent that it has passed through all of the steps shown in FIG. 1. In the embodiment shown the first mold part 03 has no microstructured cavity.

Illustration b) of FIG. 5 shows a further step in which a recess 32 is created in the first mold part 03 above the microstructured cavity 07 of the second mold part 04. The microstructured hollow space 17 within the microstructured cavity 07 of the second mold part 04 is bounded only by the first polymer film 01 in the region of the recess 32.

Illustration c) of FIG. 5 shows a step of the method according to the present invention as it appears in a subsequent application of the composite component. A force or pressure 33 acts on the first polymer film 01 in the region of the recess 32 so as to elastically deform said region of the first polymer film 01. In this way, it is possible, for example, to implement a pump in the microstructured hollow space 17.

FIG. 6 shows two steps of another particular embodiment of the method according to the present invention. Illustration a) of FIG. 6 shows a step in which a composite component is achieved after having passed through the steps shown in FIG. 3.

Illustration b) of FIG. 6 shows a further step in which the first mold form 03 and the second mold form 04 are completely removed by an etching process. The microstructured composite component now comprises the first polymer film 01, the second polymer film 02 and the tube 24. This embodiment of the method according to the present invention produces microstructured composite components that are substantially lighter and smaller. For example, this embodiment is suited for applications in which the mechanical support provided by the first mold part 03 and the second mold part 04 is not needed. The method according to the present invention can be carried out so that only one of the two mold parts 03, 04 is completely removed. Further, it is possible to only partially remove the first mold part 03 and/or the second mold part 04.

FIG. 7 shows two steps of another preferred embodiment of the method according to the present invention. Illustration a) of FIG. 7 shows a step of the method according to the present invention in which a functional element in the form of a sphere 36 is arranged between the first polymer film 01 and the second polymer film 02 in the region between the first microstructured cavity 06 and the second microstructured cavity 07.

Illustration b) of FIG. 7 shows a step of the method according to the present invention after the steps shown in FIG. 1 have been passed through. The sphere 36 is now movably situated within the microstructured hollow space 17, by means of which the function of a valve, for example, can be implemented in the microstructured hollow space 17. For example, the sphere 36 can be designed in such a way that it can be affected from outside the composite component, for example, by a magnetic field.

FIG. 8 shows four steps of a further particular embodiment of the method according to the present invention. Illustration a) shows a step in which, as in the embodiment shown in FIG. 2, additional films are introduced between the first mold part 03 and the second mold part 04. Arranged between the first mold part 03 and the first polymer film 01 are a perforated film 38 and a soluble film 39. In this embodiment, the first polymer film 01 is permeable in design.

Illustration b) of FIG. 8 shows a step after the steps in FIG. 1 of the method according to the present invention have been passed through. In the composite component the microstructured hollow space 17 is formed. The excess pressure between the first polymer 01 covered by the soluble film 39 and the second polymer film 02 was built up in such a way that the perforated film 38 and the soluble film 39 were forced into the first microstructure 06. The first polymer film 01 was, due to its permeability, not forced into the first microstructured cavity 06, with the result that it remains level in the region of the microstructured hollow space 17.

Illustration c) of FIG. 8 shows another step of the particular embodiment of the method according to the present invention, in which the soluble film 39 has been dissolved by means of a solvent. The soluble film 39 is no longer present, in particular in the microstructured hollow space 17. The function of the soluble film 39 was, in particular, to force the perforated film 38 into the first microstructured cavity 06.

Illustration d) of FIG. 8 shows a step of the particular embodiment of the method according to the present invention, in which a recess 41 has been created in the first mold part 03 in the region of the microstructured hollow space 17. The recess 41 of the composite component can be used, for example, for cultivating biological cells. The cells can absorb a fluid stored in the microstructured hollow space 17 through the perforated film 38. The cells stick by adhesion to the perforated film 38.

FIG. 9 shows two steps of a further preferred embodiment of the method according to the present invention. Illustration a) of FIG. 9 shows a step in which a permeable structure in the form of a perforated film 43 is introduced between the first polymer film 01 and the second polymer film 02. Instead of a perforated film, it is also feasible to introduce nets, lattices, weaves or similar structures.

Illustration b) of FIG. 9 shows a step of the preferred embodiment of the method according to the present invention, after having passed through the steps shown in FIG. 1. The perforated film divides the microstructured hollow space 17 and can function there as a filter, for example.

FIG. 10 shows a preferred embodiment of a device according to the present invention for producing microstructured composite components. The device according to the present invention can, for example, be used to carry out the method according to the present invention shown in FIG. 1. The device comprises first of all an upper yoke 51 and a lower yoke 52, between which the first mold part 03 and the second mold part 04 are clamped. The upper yoke 51 and the lower yoke 52 allow the first mold part 03 and the second mold part 04 to be discretely positioned such that they are precisely aligned to one another. The upper yoke 51 includes a connecting bar 53 through which the contact force 08 and the pressing force 13 can be transferred to the upper yoke 51 for pressing together the first mold part 03 and the second mold part 04 in a force-controlled manner. The contact force 08 and the pressing force 13 act against the lower yoke 52 via a housing 54. Situated in the housing 54 is first of all the upper yoke 51 and the lower yoke 52. Consequently, the first mold part 03 and the second mold part 04 as well as the first polymer film 01 and the second polymer film 02 are also arranged in the housing 54 for carrying out the method according to the present invention. The housing 54 includes a connection piece 56 to which a vacuum pump 57 is connected. With the aid of the vacuum pump 57, it is possible to create a technical vacuum in the space surrounding the first mold part 03 and the second mold part 04. The first mold part 03 and the second mold part 04 are enclosed about their circumference by a hollow cylindrically-shaped spacer ring 58. The spacer ring 58 bounds a hollow space between the first polymer film 01 and the second polymer film 02. With the aid of a first sealing ring 59 and a second sealing ring 61, the hollow space between the first polymer film 01 and the second polymer film 02 are sealed off from the spacer ring 58. The first polymer film 01 is pressed against the first sealing ring 59 on the spacer ring 58 by means of a pressure ring 62. The pressure ring 62 is also in the shape of a hollow cylinder. A bottom ring 63 is formed in the lower yoke 52 by means of which the second polymer film 02 is pressed against the second sealing ring 61 on the spacer ring 58. As a result, the first polymer film 01 and the second polymer film 02 are taken up and clamped by the pressure ring 63, the spacer ring 58 and the bottom ring 63 and are, in particular, sealed off from one another by the first sealing ring 59 and the second sealing ring 61 in such a way that the hollow space between the first polymer film 01 and the second polymer film 02 is separated from the rest of the hollow space in the housing 54. The spacer ring 58 includes an excess pressure connection 64 for connecting to a pressure source 66 by way of a valve 67. With the aid of the pressure source 66 it is possible to feed a forming gas through the valve 67 and the excess pressure connection 64 into the cavity between the first polymer film 01 and the second polymer film 02. The excess pressure connection 64 is sealed off from the housing 54.

Arranged between the pressure ring 62 and the upper yoke 51 are spring elements 68, such that through the spring elements 68 the contact force 08 and the pressing force 13 act on the pressure ring 62, by means of which said ring is pressed against the spacer ring 58 and against the lower yoke 52. Hence, the contact force 08 and the pressing force 13 also function to seal off the hollow space between the first polymer film 01 and the second polymer film 02 from the spacer ring 58.

The device according to the present invention further comprises a heating device (not shown) for heating the first mold part 03 and the second mold part 04.

The upper yoke 51 and the lower yoke 52 are sized, for example, to be able to accommodate mold parts 03, 04 having a cross-section of 10 cm×20 cm.

LIST OF REFERENCE NUMERALS

01—first polymer film
02—second polymer film
03—first mold part
04—second mold part
05—-
06—first microstructured cavity
07—second microstructured cavity
08—contact force
09—applied heat
10—-
11—vacuum
12—forming gas
13—pressing force
14—outer surfaces
15—-
16—heat
17—microstructured hollow spaces
18—-
19—-
20—-
21—third film
22—fourth film
23—-
24—tube
25—-
26—tube sleeve
31—recess
32—recess
33—pressure/force
34—-
35—-
36—sphere
37—-
38—perforated film
39—soluble film
40—-
41—recess
42—-
43—-perforated film
51—upper yoke
52—lower yoke
53—connecting bar
54—housing
55—-
56—connection piece
57—vacuum pump
58—spacer ring
59—first sealing ring
60—-
61—second sealing ring
62—pressure ring
63—bottom ring
64—excess pressure connection
65—-
66—pressure source
67—valve
68—spring elements

The invention claimed is:

1. A method for producing a microstructured composite component, comprising the following steps:
arranging a first foil over a second foil between a first mold component and a second mold component, wherein the first mold component and/or the second mold component comprises microstructured hollow shapes to be filled in;
heating the first mold component and the second mold component in order to, conveyed over it, heat the first foil and the second foil;

creating an overpressure between the first foil and the second foil in order to force the first foil and/or the second foil into the microstructured hollow shapes to be filled in, wherein the overpressure is greater than a pressure surrounding the first mold component and the second mold component;

pressing together the first mold component and the second mold component, with the first foil arranged in-between, and with the second foil arranged in-between, by means of a pressing force, in order to integrally interconnect contacting regions of the surfaces between the first foil and the first mold component, between the second foil and the second mold component, and between the first foil and the second foil; and cooling the first mold component, the second mold component, the first foil and the second foil, such that the first and second mold components and first and second foils are permanently and materially bonded, whereby the microstructured composite component is formed.

2. The method according to claim 1, wherein a thermoplastic is used as a material for the first foil and for the second foil.

3. The method according to claim 2, wherein the heating the first foil and the second foil takes place at least to a glass transition temperature of the thermoplastic.

4. The method according to claim 1, wherein the first foil and the second foil are pre-structured prior to being arranged between the first mold component and the second mold component.

5. The method according to claim 1, wherein during arrangement of the first foil above the second foil, functional elements and/or a third foil are arranged between the first foil and the second foil.

6. The method according to claim 1, wherein after cooling has taken place, the first mold component and/or the second mold component are provided with one or more recesses in order to expose the first foil and/or the second foil in the region of the one or more recesses.

7. The method according to claim 1, wherein the microstructured hollow shape to be filled in of the first mold component and the microstructured hollow shape to be filled in of the second mold component are configured in mirror symmetry, wherein the first mold component and the second mold component are pressed together in such a way that the microstructured hollow shape to be filled in of the first mold component and the microstructured hollow shape to be filled in of the second mold component are mirror images of one another.

* * * * *